United States Patent

[11] 3,577,056

[72] Inventor Kazunobu Tsujikawa
Tokyo, Japan
[21] Appl. No. 806,352
[22] Filed Mar. 12, 1969
[45] Patented May 4, 1971
[73] Assignee Sony Corporation
Shinagawa-ku, Tokyo, Japan
[32] Priority Mar. 13, 1968
[33] Japan
[31] 43/16283

[54] DC MOTOR SERVOSYSTEM
6 Claims, 14 Drawing Figs.

[52] U.S. Cl. .... 318/314, 318/318
[51] Int. Cl. .... H02p 5/16
[50] Field of Search .... 179/100.2 (T); 178/6.6; 318/314, 318, 308, 328

[56] References Cited
UNITED STATES PATENTS

| | | | |
|---|---|---|---|
| 2,780,668 | 2/1957 | Farr et al. | 318/318X |
| 3,355,649 | 11/1967 | Boylan et al. | 318/314 |
| 3,361,949 | 1/1968 | Brown et al. | 318/314 |
| 3,478,178 | 11/1969 | Grace | 318/314 |

*Primary Examiner*—Oris L. Rader
*Assistant Examiner*—Robert J. Hickey
*Attorneys*—Albert C. Johnston, Robert E. Isner, Lewis H. Eslinger and Alvin Sinderbrand

ABSTRACT: In order to control the phase and speed of a DC motor, particularly employed for driving the rotary magnetic heads of a video tape recorder, the output of a signal generator having a frequency corresponding to the rotational speed of the motor is fed through a demodulation circuit to a clamping circuit, and the rotational speed of the motor is controlled in accordance with variations in an output level resulting from the slicing of the output of the clamping circuit at a reference level. Simultaneously, the rotational position of the DC motor is detected and compared with an external reference signal, for example, the synchronizing signal of a television signal, and the clamp level of the clamping circuit is controlled by the output resulting from the comparison, thereby to drive the motor in synchronism with the external reference signal.

INVENTOR.
KAZUNOBU TSUJIKAWA

BY [signature] ATTORNEY

INVENTOR.
KAZUNOBU TSUJIKAWA

BY [signature]
ATTORNEY

INVENTOR.
KAZUNOBU TSUJIKAWA

BY [signature]

ATTORNEY

DC MOTOR SERVOSYSTEM

This invention relates to a DC motor servosystem, and more particularly is directed to a servosystem for a DC motor which drives rotary magnetic heads in a video tape recorder.

In conventional video tape recorders of the type having, for example, a rotary magnetic head assembly which is driven by a DC motor, the rotary shaft of the magnetic head assembly has associated therewith a signal generator which produces a frequency signal corresponding to the rotational speed of the rotary shaft, and a servo loop is provided to control the rotational speed of the rotary shaft with the signal produced by the signal generator. Further, the frequency of the signal from the signal generator is selected to be, for example, 15.75 kHz., and is applied to a camera as a horizontal synchronizing signal for the electron beam horizontal scanning in the image pickup tube, by which signals from the camera are recorded while maintaining the camera and the rotary magnetic heads in synchronized condition. With such conventional arrangement, the signals fed from the camera can be recorded, but external signals having synchronizing signals, for example, television signals received by a television receiver cannot be recorded in synchronism with the revolution of the rotary magnetic heads.

Accordingly, it is an object of the present invention to make possible the easy and accurate recording of external signals even with video tape recorders employing a DC motor.

A specific object of this invention is to provide a device for controlling the phase and speed of DC motors.

Another object is to provide a magnetic recording and reproducing device having rotary magnetic heads which are driven while being phase-controlled by external synchronizing signals.

Still another object of this invention is to provide a magnetic recording and reproducing device employing a DC motor which is capable of recording television video signals.

In accordance with the present invention, an output of a signal generator, which produces a signal of a frequency corresponding to the rotational speed of a DC motor, is fed through a demodulation circuit to a clamping circuit and the rotational speed of the DC motor is controlled in accordance with the variations in an output level produced by slicing the output of the clamping circuit at a reference level. Simultaneously, the rotational position of the DC motor is detected and is compared with an external signal and the clamp level of the clamping circuit is controlled by the compared output thereby to drive the DC motor and consequently the rotary magnetic heads in synchronism with the external reference signals.

The above, and other objects, features and advantages of this invention, will become apparent from the following description of illustrative embodiments which is to be read in conjunction with the accompanying drawings, in which.

Figures 1, 2:
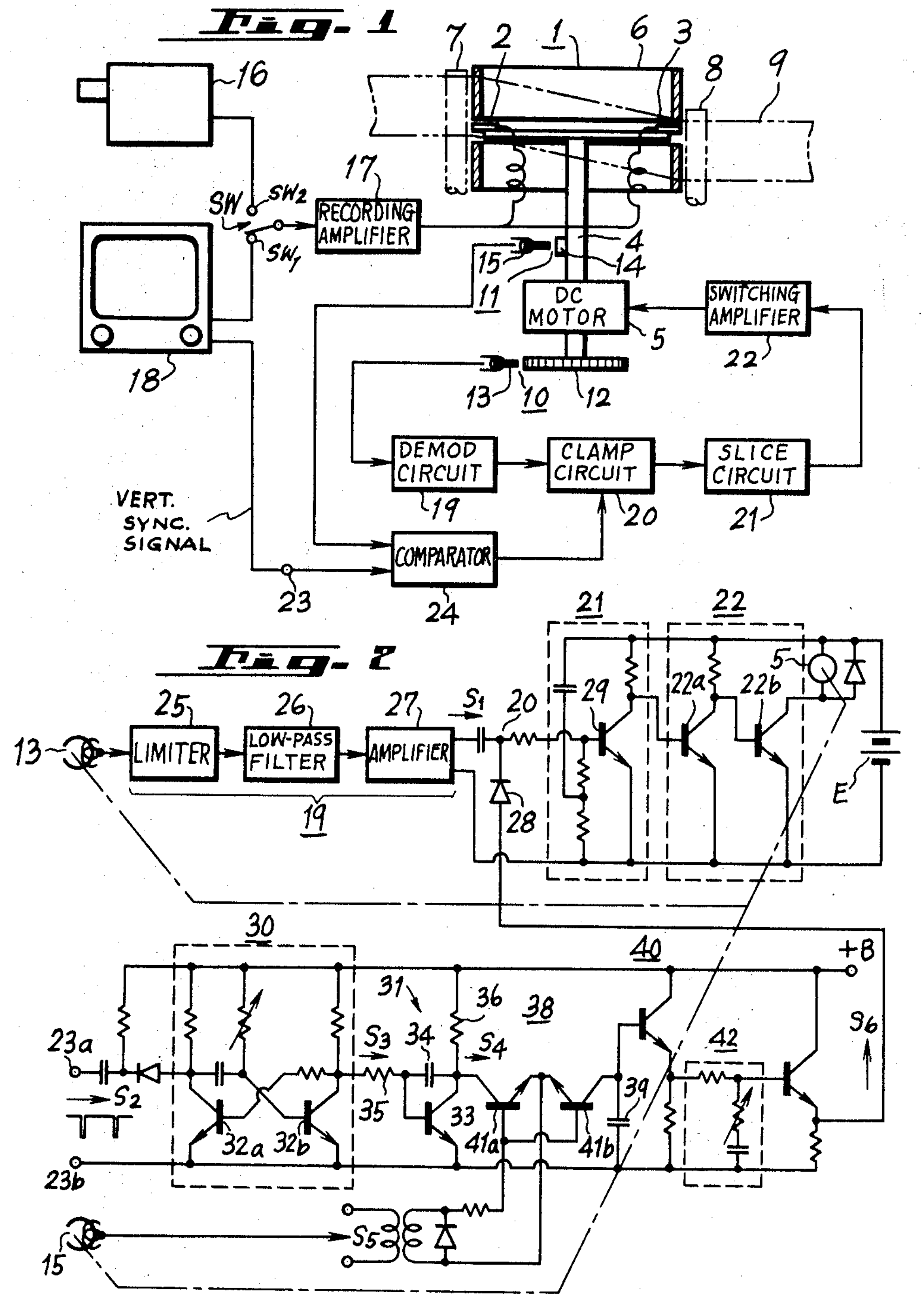
FIG. 1 is a block diagram of a magnetic recording and reproducing device produced according to one embodiment of this invention.
FIG. 2 is a wiring diagram showing one example of a speed control device according to this invention.

Referring to FIG. 1 in detail, wherein an embodiment of this invention is shown applied to a magnetic video tape recorder, it will be seen that such recorder includes a rotary magnetic head assembly 1 which comprises, for example, two rotary magnetic heads 2 and 3, and a rotary shaft 4 for driving the heads from a DC motor 5. A magnetic tape 9 is guided around the periphery of a head drum 6 by means of guide pins 7 and 8. The rotary shaft 4 further has mounted thereon a signal generator 10 for producing a signal of a frequency corresponding to the rotational speed of shaft 4 and a pulse generator 11 for generating pulses in response to the rotational position of shaft 4 and hence of rotary magnetic heads 2 and 3. The signal generator 10 is designed to produce a signal having a frequency of 15.75 kHz., that is, the horizontal synchronizing signal of the standard television system, during steady-state revolution of the DC motor 5 and, for the foregoing purpose, signal generator 10 may consist of a disc having a plurality of magnetized poles at its periphery, for example, a cogwheel or gear 12 having a plurality of magnetized teeth formed at its periphery, and a magnetic head 13 disposed opposite cogwheel 12. The pulse generator 11 consists of a magnetic piece 14 mounted on rotary shaft 4 at a predetermined position and a magnetic head 15 disposed opposite magnetic piece 14. Since the head assembly 1 employs two rotary heads 2 and 3, it is possible to provide another magnetic piece not shown on shaft 4 at a position diametrically opposite to the piece 14 and to use it for producing a vertical synchronizing signal.

When video signals from a television camera 16 are to be recorded on tape 9 by the video tape recorder, a switch SW is displaced from engagement with contact $SW_1$, as shown, to engagement with contact $SW_2$ connect to camera 16, and the signals produced by pulse generator 11 and signal generator 10 are applied to the camera to lock the phases of vertical and horizontal synchronizing signal oscillators, by which synchronized video signals fed through a recording amplifier 17 can be recorded on the magnetic tape in the form of skew magnetic tracks. However, in the case of recording an output of a television receiver 18, the synchronizing signals of the television signals to be recorded are fixed ones and their phase cannot be locked with the synchronizing signals of the video tape recorder.

Therefore, in accordance with the present invention, the sine wave signal of signal generator 10 is applied through a demodulation circuit 19 to a clamping circuit 20 and a slice circuit 21 to produce a signal corresponding to a change in the revolving speed of the DC motor 5 and this signal is fed to a switching amplifier 22 for driving the DC motor 5 to control its revolving speed. In order to synchronize the revolution of the rotary magnetic heads in phase with the television signals being recorded, the vertical synchronizing signal fed from the television receiver 18 is applied through a terminal 23 to a comparator circuit 24 to be compared with the output signal of pulse generator 11 and, in accordance with the resulting comparison signal, the clamp level of the aforementioned clamping circuit 20 is changed, thereby to synchronize the rotational phase of rotary shaft 4, that is, the rotational positions of rotary magnetic heads 2 and 3 with the phase of the television signals being recorded.

Referring now to FIG. 2, a suitable circuit arrangement for performing the above operations will hereinbelow be described in greater detail. It will be seen that the sine wave signal of a frequency of approximately 15.75 kHz. which constitutes the output of head 13, is applied to a limiter 25 to produce a rectangular wave signal of a certain amplitude, which signal is fed to a low-pass filter 26 to be frequency-demodulated and, if necessary, it is amplified by an amplifier 27, producing a demodulated signal $S_1$ indicated in full lines on FIG. 3. The limiter 25, the low-pass filter 26 and the amplifier 27, which together constitute the demodulation circuit 19 of FIG. 1, are of known construction, and hence no detailed description will be given thereof in this specification.

The demodulated signal $S_1$ thus produced is applied to clamping circuit 20 which, as shown on FIG. 2, may comprise a diode 28 or the like and is then sliced at a reference level, as by slice circuit 21, which may comprise a transistor 29 and the voltage V of the so-called slice level (FIG. 3) can be determined in accordance with a forward voltage applied between the base and emitter of transistor 29 so that voltage V is always held constant. It will be apparent that transistor 29 conducts in a flow time $\tau$ when the magnitude of signal $S_1$ exceeds the slice level V.

The switching amplifier 22 which receives the output of slice circuit 21 may consist of a DC amplifier circuit constituted by, for example, transistors 22*a* and 22*b* directly coupled together (FIG. 2) and DC motor 5 is connected in a DC circuit between the collector and emitter transistor 22*b* and which includes a DC power source E. The foregoing provides a servosystem for the DC motor 5 as will become apparent from the following description of operation.

An external reference signal $S_2$ (FIG. 4A), for example, a vertical synchronizing signal separated from television signals being received by receiver 18, is applied to terminals 23*a* and 23*b* to which there is connected, for example, a monostable multivibrator 30 for decreasing the frequency of the signal $S_2$ to one-half of the frequency applied to terminals 23*a*, 23*b*. At the output side of monostable multivibrator 30 an output signal $S_3$ (FIG. 4B) is produced which rises every other vertical synchronizing signal $S_2$ and the output signal $S_3$ is applied to an integrator circuit, for example, a Miller integrator circuit 31, at the output side of which is produced a signal $S_4$ (FIG. 4C) which is inclined at the rise (or fall) and is synchronized with the signal $S_3$. Since the monostable multivibrator 30 and the Miller integrator circuit 31 are of known construction, no detailed description will be given thereof other than to state that a pair of transistors 32*a* and 32*b* make up the monostable multivibrator 30, and that a transistor 33, a capacitor 34 and resistors 35 and 36 comprise the Miller integrator circuit 31. It will be apparent from FIGS. 4A and 4B that, by suitable selection of the time constant of the monostable multivibrator 30, the period of its output signal $S_3$ can be made to coincide with a period twice that of the signal $S_2$.

Figures 4A, 4B, 4C, 4D, 4E:
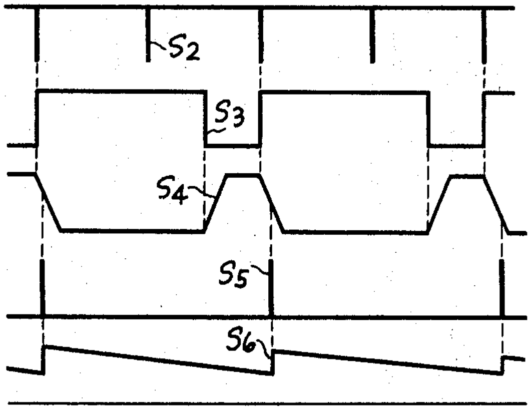

A signal $S_5$ (FIG. 4D) from the aforementioned magnetic head 15 (assume that one pulse is produced at a certain rotational angular position during each revolution of shaft 4) is applied, as shown, to a gate circuit 38 to sample the inclined portion of signal $S_4$, and the resulting output is stored in a capacitor 39 in the form of a signal $S_6$ (FIG. 4E). The signal $S_6$ is applied through a DC amplifier circuit 40 to the aforementioned clamping circuit 20 of the servosystem.

In the gate circuit 38, the emitters and bases of transistors 41*a* and 41*b* comprising such circuit are interconnected and the signal $S_5$ is applied between the bases and emitters, and when the transistors 41*a* and 41*b* are in the "on" state the signal $S_4$ is fed to capacitor 39 through the collectors and emitters of the transistors.

With such an arrangement, the electric charge from the capacitor 39 storing the aforementioned signal $S_6$ is not discharged through the gate circuit 38 except when the signal $S_5$ arrives. A filter 42 is inserted in the DC amplifier circuit 40 for removing the transient characteristic of the signal applied thereto.

Figure 3:
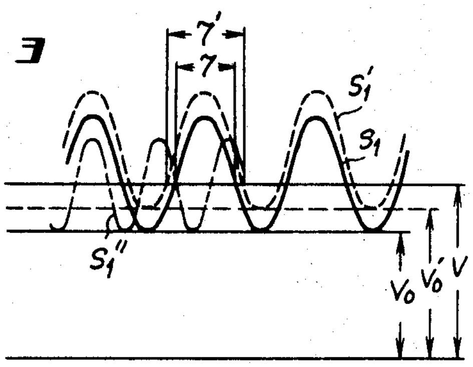
FIG. 3 and 4A to 4E are waveform diagrams which are referred to in explaining the operation of the device according to this invention.

The signal $S_6$ thus obtained represents the result of comparison of the reference signal $S_2$, that is, the vertical synchronizing signal in the case of the television signal, with the rotational angular position of the DC motor 5 as indicated by the signal $S_5$ from head 15. The signal $S_6$ is applied to the anode side of the diode 28 of clamp circuit 20, and the clamping level $V_0$ of signal $S_1$ shown in FIG. 3 is varied in accordance with the magnitude of the signal $S_6$, for example, as indicated by the broken line $S_1'$. Consequently, the flow angle $\tau$ of the signal $S_1$ varies as indicated by $\tau'$, by which phase control of motor 5 can be achieved.

Also in the case where the rotational speed of motor 5 changes and the output signal $S_1$ from amplifier 27 is thereby caused to vary as indicated by the broken line $S_1'$, the aforementioned flow angle $\tau$ varies to thereby control the revolving speed of the motor 5.

Thus, the present invention makes it possible to effect magnetic recording of received television signals with ease.

It has been previously proposed to effect the above-described revolution and phase control by phase comparison of a rectangular wave signal, produced by shaping the waveform of the signal $S_1$ from the signal generator 10, with a rectangular wave signal from the monostable multivibrator at the time of drive termination, with the monostable multivibrator being driven by the former rectangular wave signal and the revolving speed of the motor or the rotary shaft being controlled by the compared signal (the phase-compared signal). At the same time, the duty factor of the pulse derived from the monostable multivibrator is changed by a signal obtained by comparing the external reference signal $S_2$ with the phase-detecting signal $S_5$, and by which the time duration of the phase-compared signal is controlled to thereby effect phase control of the motor. With this method, the duty factor of the monostable multivibrator is likely to be altered by the ambient temperature. However, the arrangement according to the present invention avoids such defect.

Further, in the case of recording according to this invention without using the external reference signal $S_2$, for example, in the case of recording through the use of the camera, the revolving speed of the DC motor can be controlled by holding the output of clamping circuit 20 at a constant value. In addition, even in the absence of the external reference signal $S_2$ during the recording of video signals in synchronism with the external reference signal $S_2$, the revolving speed of the DC motor 5 is controlled by the speed control loop, and hence is maintained stable.

Figure 5:
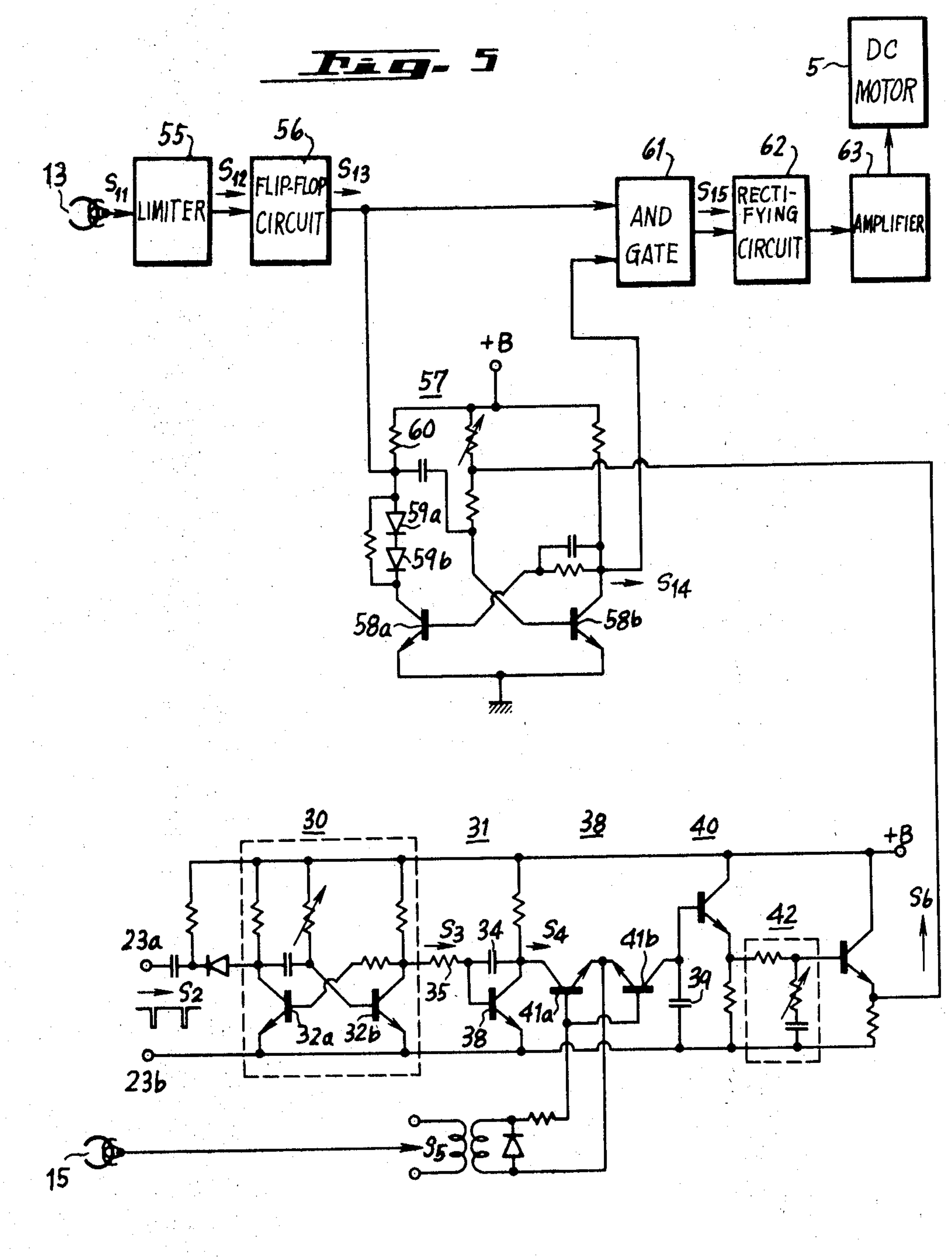
FIG. 5 is a wiring diagram illustrating another embodiment of this invention.

In FIG. 5 there is illustrated another embodiment of this invention which differs from the previously-described embodiment in respect of the speed control servosystem. In FIG. 5, elements similar to those in the foregoing embodiment are identified by the same reference numerals and the description thereof is not repeated. In the arrangement of FIG. 5, as signal $S_{11}$ produced by magnetic head 13 of signal generator 10 is a sine wave voltage (FIG. 6A), and such signal $S_{11}$ is converted by a limiter 55 into a rectangular wave $S_{12}$ (FIG. 6B) which is applied to a flip-flop circuit 56, thereby producing a flip-flop output $S_{13}$ (FIG. 6C) which turns "off," for example, at the fall of signal $S_{12}$ and turns "on" at the next fall of signal $S_{12}$. The time from the decay to the rise of signal $S_{13}$ is indicated by $t_1$. The limiter 55 and flip-flop circuit 56 may be of known circuit constructions and hence will not be described in detail herein.

Figures 6A, 6B, 6C, 6D, 6E:
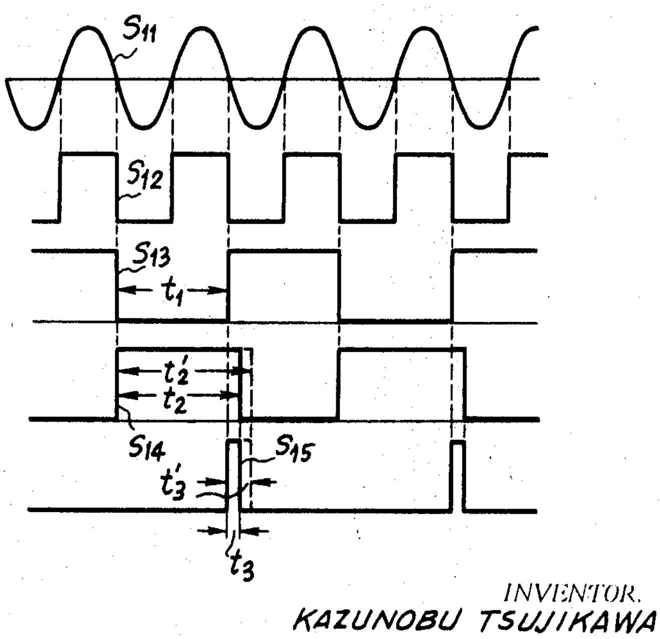
FIG. 6A to 6E are waveform diagrams which are referred to in explaining the operation of the arrangement illustrated by FIG. 5.

The output of flip-flop circuit 56 is applied to a monostable multivibrator 57 to produce an output signal $S_{14}$ (FIG. 6D) which rises, for example, at the fall of signal $S_{13}$. The time duration of signal $S_{14}$ is indicated by $t_2$. The monostable multivibrator 57 is also of known construction, as shown in FIG. 5, in which reference numerals 58*a* and 58*b* designate a pair of transistors and reference numerals 59*a* and 59*b* designate diodes provided for temperature compensation. The signal $S_{13}$ is applied between diode 59*a* and a resistor 60 which is interposed between diode 59*a* and a power source +B, and output signal $S_{14}$ is obtained from the collector of the transistor 58*b*. The resulting signal $S_{14}$ and the aforementioned signal $S_{13}$ are fed to an AND gate circuit 61 to provide a signal $S_{15}$ (FIG. 6E). In this case the time duration $t_2$ of signal $S_{14}$ is constant and signal $S_{13}$ varies with the revolving speed of rotary shaft 4 of the DC motor 5, so that the time duration $t_3$ of signal $S_{15}$ varies with the revolving speed of the motor 5.

The signal $S_{15}$ thus obtained is applied to a current control circuit of the motor 5 through a rectifier circuit 62 and, if necessary, through a DC amplifier circuit 63, by which the revolving speed of the motor 5 can be held constant, that is, a servo loop for the revolving speed control can be constituted. Since the aforementioned AND gate circuit 61, rectifier circuit 62 and DC amplifier circuit 63 may be of known construction, detailed descriptions thereof will not be given herein.

When television signals are to be recorded with the arrangement of FIG. 5, the signal $S_6$ (FIG. 4E), which corresponds to the difference between the vertical synchronizing signal of the television signals and the rotational angular position of the DC motor 5, and is produced by the circuits 30, 31, 38, 40 and 42 above described, is applied to the monostable multivibrator 57. In this case, the voltage fed to the base of transistor 58*b* can be changed with the signal $S_6$, by which the decay of output $S_{14}$ of the monostable multivibrator circuit 57 varies, as indicated by the dotted line on FIG. 6D and its time duration $t_2$ changes to $t_2'$. As a result of this, the time duration $t_3$ of signal $S_{15}$ is also changed to $t_3'$ and the speed of rotation of motor 5 can be controlled while being synchronized in phase with the vertical synchronizing signal.

In the embodiment which employs the monostable multivibrator circuit 57, the time duration of its output is varied in response to a lack of synchronization, and this change is easily effected and its range is wide to provide for a wider synchronization range of the servosystem.

Although illustrative embodiments of the invention have been described in detail herein with reference to the drawings, it is to be understood that the invention is not limited to those precise embodiments, and that various changes and modifications may be effected therein by one skilled in the art without departing from the scope or spirit of the invention.

I claim:

1. A DC motor servosystem comprising:

a DC motor, a signal generator for producing a signal of a frequency corresponding to the rotational speed of said DC motor, a clamping circuit for clamping said signal produced by the signal generator, a slice circuit for slicing the clamped output of said clamping circuit at a predetermined slice level, motor-controlling means for controlling the rotational speed of said DC motor with the slice signal output from said slice circuit, a pulse generator for producing a pulsed signal corresponding to the rotational phase of the DC motor, a source of an external synchronizing signal, comparator means for producing a signal of a voltage corresponding to a phase difference between said external synchronizing signal and said pulsed signal produced by the pulse generator, and means for changing the slice level of said slice circuit in accordance with the signal voltage from said comparator means.

2. A DC motor servosystem according to claim 1, wherein said signal generator includes a disc having a plurality of magnetic poles at its periphery and driven by the DC motor, and a magnetic head disposed adjacent to the periphery of said disc.

3. A DC motor servosystem according to claim 1, wherein said pulse generator consists of a magnetic piece mounted on a shaft driven by said DC motor and fixed at a predetermined angular position with respect to said shaft, and a magnetic head disposed adjacent the path of travel of said piece with the shaft.

4. A DC motor servosystem comprising:

a DC motor, a signal generator for producing a signal of frequency corresponding to the rotational speed of said DC motor, a multivibrator circuit driven in synchronism with said signal produced by the signal generator, an AND circuit receiving the output of said multivibrator circuit and the signal produced by said signal generator to produce a pulse signal having a time duration varying with a change in the frequency of said signal produced by the signal generator, a circuit for driving the DC motor in accordance with said pulse signal from AND circuit, a pulse generator for producing a pulsed signal corresponding to the rotational phase of the DC motor, a source of external synchronizing signal, means for producing a signal voltage corresponding to a phase difference between an external synchronizing signal and the pulsed signal produced by said pulse generator, and means for changing the pulse width of the output of said multivibrator in accordance with said signal voltage.

5. A DC motor servosystem according to claim 4, wherein the signal generator consists of a disc having a plurality of magnetic poles provided at its periphery and driven by the DC motor and a magnetic head disposed adjacent to the periphery of said disc.

6. A DC motor servosystem according to claim 4, wherein the pulse generator consists of a magnetic piece mounted on a shaft driven by said DC motor and fixed at a predetermined angular position with respect to said shaft, and a magnetic head disposed adjacent the path of travel of said piece with the shaft.